United States Patent

Jindra et al.

(10) Patent No.: US 7,452,564 B2
(45) Date of Patent: Nov. 18, 2008

(54) BAKE STABLE LOW WATER ACTIVITY FILLING

(75) Inventors: James A. Jindra, Wooster, OH (US); John P. Hansen, Wadsworth, OH (US); Mark S. Grucza, Wadsworth, OH (US)

(73) Assignee: The J.M. Smucker Company, Orrville, OH (US)

( * ) Notice: Subject to any disclaimer, the term of this patent is extended or adjusted under 35 U.S.C. 154(b) by 711 days.

(21) Appl. No.: 10/408,162

(22) Filed: Apr. 8, 2003

(65) Prior Publication Data

US 2004/0202764 A1 Oct. 14, 2004

(51) Int. Cl.
A23G 3/44 (2006.01)
A23G 3/46 (2006.01)
A23J 1/20 (2006.01)

(52) U.S. Cl. .................... 426/657; 426/658

(58) Field of Classification Search ............ 426/590, 426/601–602, 656, 657, 658
See application file for complete search history.

(56) References Cited

U.S. PATENT DOCUMENTS

| | | | | |
|---|---|---|---|---|
| 4,283,430 A | * | 8/1981 | Doster et al. | 426/284 |
| 5,171,603 A | * | 12/1992 | Singer et al. | 426/572 |
| 5,932,270 A | | 8/1999 | Rock | |
| 6,322,829 B1 | * | 11/2001 | McGlynn et al. | 426/89 |
| 6,770,316 B2 | * | 8/2004 | Jindra et al. | 426/572 |
| 2003/0161928 A1 | * | 8/2003 | Rock et al. | 426/572 |

OTHER PUBLICATIONS

U.S. Appl. No. 09/748,768, filed Mar. 4, 2003, Jindra.

* cited by examiner

*Primary Examiner*—Arthur L Corbin
(74) *Attorney, Agent, or Firm*—Calfee, Halter & Griswold LLP

(57) ABSTRACT

A bake stable filling with a water activity of less than 0.60 comprising a matrix including a globulin protein with a dispersion of oil.

75 Claims, 3 Drawing Sheets

BAKE STABLE LOW WATER ACTIVITY FILLING

The present invention is directed to the art of fillings for baked products, such as crackers, pretzels, cookies and cakes and more particularly to a bake stable low water activity filling that can be stored for long periods of time and applied to, or injected into, a dough or casing preparatory to the dough or casing being baked into a finished product.

BACKGROUND OF INVENTION

With the advent of a public desire for a variety of snacks and other convections, it has become somewhat common practice to combine baked dough products with fillings, either fruit or otherwise. When combining fillings with baked products, the food technology is advancing to develop processes and fillings which do not degrade the dough product and also allows efficiency in combining and baking such products. The use of fillings have often posed numerous technical difficulties related to eating quality and shelf-life when used in combination with extremely low water activity food casings or food materials where it is desirable to maintain the crispness of the casing or food material. Moisture will often migrate from the filling to portions of the food casing or casing material where moisture levels and water activities (Aw) are lower than that of the filling. This can cause undesirable changes both in the texture of the food casing and in the overall shelf-life of the finished food. To maintain the shelf-life and the desired textural properties (crisp/crunchy) of the food casing, the filling must be at an Aw equal to or below that of the food casing. As an advance in the technology, a process and a formulation is described in Jindra application Ser. No. 09/748,768), incorporated by reference herein as background information.

The formula and processing method as disclosed in Jindra, U.S. Pat. No. 6,528.104, refers to a low moisture filling with an Aw less than 0.60 (preferably less than 0.40) that is applied to or injected into a pre-baked food casing or food material. This prior method is not used where the filling is applied to or injected prior to the baking process. Consequently, most manufacturers of filled bakery items, particularly filled pretzels, inject or apply the filling only after the dough casing has been baked. This method of incorporating a low Aw filling into a previously baked dough or food casing can often result in inconsistencies related to fill levels and breakage both of which can result in substantial amounts of re-work, product loss, or consumer dissatisfaction.

Most fillings below an Aw of 0.60, and more specifically below an Aw of 0.40, can contain as little as 5% moisture. Such conditions adversely affect and even preclude the use of most stabilizers, such as starches and hydrocolloids which are commonly used to provide bake stability in higher moisture fillings (Aw>0.60) as disclosed in Rock (U.S. Pat. No. 5,932, 270). Rock U.S. Pat. No. 5,932,270 is also incorporated by reference. Ingredients in the Rock patent rely on the availability of excess water to provide a means of hydration whereby functionality (i.e., bake stability) is achieved. Bake stability is generally measured in the degree of spread a filling experiences when subjected to oven conditions. The greater the degree of spread the less bake stability a filling possesses. There is general industry consensus that such ingredients cannot provide the same level of functionality in fillings whose Aw is less than 0.60 and more specifically those whose Aw is less than 0.40 for the very reason that water is unavailable for proper hydration. Therefore, it is for this reason fillings of the prescribed water activity are not considered bake stable.

Fillings with water activities less than 0.60, and more specifically less than 0.40, generally use high levels of shortening or oil to replace water. This is done not only to lower the Aw of the filling but also to provide some fluidity during processing in order to increase the ease of manufacture. The high levels of oil in such fillings presents a twofold problem in terms of bake stability. The first being that by replacing water with oil, the oil is unable to activate starches and/or hydrocolloids that might otherwise provide some level of bake stability. Second and more importantly, the oil is heat sensitive and quickly melts at slightly elevated temperatures (75 F-145 F). Generally, internal filling temperature reaches 190 F during bake. As the oven temperature rises, the oil/shortening melts and with little effort begins to leach out of the filling into the surrounding casing or food material. Depending on the degree of leaching, the effect can be detrimental to visual appeal and also the organoleptic qualities of the filling.

Therefore, it is desirable to develop a filled food product having a filling with low water activity that combines desirable organoleptic characteristics and ease of manufacture with excellent bake stability.

SUMMARY OF INVENTION

The present invention relates to the composition of a filling or paste, which composition is accomplished by a specific process. The primary aspect of this invention involves the use of a globulin protein, preferably whey protein (comprised of β and α-lactoglobulins) alone or in combination with microcrystalline cellulose to provide the desired bake stability through the oven. The globulin protein includes but is not limited to casein, ovalbumin, serum albumin, seed globulins (i.e., protein derived from oats, peanut, soybean, wheat, rapeseed, corn, sunflower), or protein derived from other natural, plant or animal sources. Cellulose sources other than microcrystalline cellulose includes but is not limited to carboxymethyl cellulose (CMC), hydroxypropylmethyl cellulose, cellulose, cellulose gum, and cellulose gel.

The major component of whey protein from milk is made up of P-Lactoglobulin (58%). The second most abundant protein is α-Lactoglobulin (13%), followed by immunoglobulins (12%), serumalbumin (6%), and various minor proteins (12%). It is well known that aggregation and gelation of such globular proteins is affected by pH and ionic strength in combination with heat above the protein's denaturation threshold. In this way, globular proteins can form a heat induced three-dimensional gel network (particle gel), the structure and functionality of which is dependent again upon environmental factors like pH, ionic strength, and heating history. The type of microstructure formed affects not only the visual appearance of the gel, but the ability to bind/control ingredients/compounds, as well as water-holding capacity. Several basic functions of proteins in foods include (a) foam formation, (b) fiber spinning, (c) emulsification, (d) dough formation, (e) extrusion, (f) viscosity, (g) gelation and (h) flavor.

The present invention represents a distinct departure in the method traditionally used to produce bake stable fillings. In most cases, fillings with a water activity above 0.60, rely on hydrocolloids and/or starches to physically control the water present. Starches and some hydrocolloids will absorb water making the filling more viscous and less likely to spread during bake. Other hydrocolloids, such as alginate, are able to form a heat stable (irreversible) gel network that again minimizes spread during bake. Again, for these approaches to work, the water activity must be such (>0.50) so sufficient water is available to properly hydrate the starches and/or hydrocolloids. In fillings with a water activity less than 0.50 and more specifically less than 0.40, that is the focus of this invention, there is insufficient water available to effectively use starches and/or hydrocolloids as the primary method of achieving the desired bake stability. As a result, industry finds it difficult to impart bake stability to fillings with such low water activities. The present invention makes use of the thermally (heat) induced gel properties of whey protein in the absence of significant quantities of water to form a three-dimensional particle gel network that not only minimizes spread during bake (achieves desired bake stability) but whose microstructure is able to bind or physically obstruct the release of hydrogenated shortening or oil during the time that high temperatures are encountered in the oven. It is well known that protein denaturation can result in significant changes in the ability to bind or emulsify fat or oil.

In one aspect of this invention, whey protein concentrate is used in a filling whose pH range varies from 3.0 to 6.5. Further, the fillings may be either fruit with a pH less than 5.0 or savory with a pH greater than 5.0. As mentioned earlier, pH in combination with heat denaturation of the protein, plays an important role in the kinetics of how the protein gel structure forms and it's resulting impact on bake stability and oil retention. This same process occurs as the filling is exposed to higher temperatures through the oven. β-Lactoglobulin, the predominant protein in whey, denatures at about 78° (172° F.) with greater denaturation in the presence of calcium while α-Lactoglobulin is relatively heat stable. The thermal mechanism alone of protein denaturation generally follows the pattern where the protein molecule absorbs energy and the bonds weaken so unfolding results in exposure of hydrophopic group and aggregation. As the pH of the filling approaches and falls below the isoelectric point of the whey protein, the net protein charge decreases resulting in formation of a uniform network of dense protein coagulates that arise through the previous aggregation of the protein particles themselves. What results is commonly referred to as a particle gel. As the pH drops or acidity increases, the resulting bake stability increases as well. Therefore, the optimum pH for finished fillings using whey protein and having an Aw<0.60 ranges from 3.0-5.0 and more typically 3.5-4.0. Within this range optimum bake stability and oil retention is achieved. It is under these conditions that a liquid oil at room temperature can be used. The use of an oil that is fluid at room temperature offers greater flexibility in terms of manufacturing. In an aspect of this embodiment the protein includes, but is not limited to, a whey derived protein under the trade name Protient WPC80 by Protient. The use level of whey protein concentrate ranges from 1-20% and more typically 5-10% by weight of the final filling.

Where the pH of the filling is greater than 5.0 use of only liquid oil is more difficult. As the pH moves away from the protein's isoelectric point toward a more neutral pH, the net charge of the protein increases that leads to greater unfolding of the protein molecule. This in turn leads to greater repulsion among the protein molecules themselves. The higher pH in combination with thermal denaturation of the whey protein leads to a more heterogenous, highly phase separated network (almost curdling). While this particular microstructure significantly reduces spread of the filling during bake, it becomes less able to prevent liquid oil from leaching out from the filling. Therefore, another embodiment of the invention is used for a filling with a pH above 5.0. In this embodiment, higher melting point shortenings are used in combination with the whey protein to provide the structure and stability required to minimize leaching out of the oil during bake. Two or more shortenings of differing melt points may be used as in the Jindra application. The ratios of the low and high melting point shortenings are manipulated in such a way as to achieve the desired textural characteristics, but more importantly to supplement the protein microstructure in minimizing the leaching of oil during the baking process. The higher melting point shortenings constitute one or more of the following edible oils and can include a composition of triglycerides, diglycerides, or monoglycerides or any mixture thereof. In yet another embodiment the edible shortenings includes natural, hydrogenated, and/or partially hydrogenated oils or shortenings. The source includes, but is not limited to, soybean, cottonseed, canola, peanut, safflower, sunflower, coconut, palm, palm kernal, olive, butterfat, cocoa butter, tallow, lard, and/or corn. Generally, the weight percentage of the lower melting point shortening in the final filling is greater than the weight percentage of the higher melting point shortening. The melting temperature of the low melting point shortening is generally not greater than 100° F. In one example, the low melt point shortening includes, but is not limited to, a soybean based edible shortening sold under the trade name PS12 by ACH. In another example, the use level of the low melting point shortening ranges from 1-50% of the weight of the filling. More specifically the low melting point shortening ranges from 10-30% of the weight of the final filling.

The high melting point shortening is used as a crystal seeding substance to cause crystals to grow as the filling is cooled during manufacture and can also be used to adjust the melting point and setting time of the filling. This is taught in the Jindra application. The higher melting point shortening functions as a stabilizing agent as the filling is exposed to higher oven temperatures. The high melt point shortening has an average melting point temperature that is greater than the average melting point temperature of the low melting shortening. In one embodiment the average melting point temperature of the high melting point shortening is at least 5° F. above the average melting point temperature of the low melting point shortening. In one aspect of this embodiment the average melting point temperature of the high melting point shortening is at least 10° F. above the average melting point temperature of the low melting shortening. In another aspect of this embodiment the average melting point temperature of the high melting point shortening is at least 20° F. above the average melting point temperature of the low melting point shortening. In still another aspect of this embodiment the average melting point temperature of the high melting point shortening is at least 40° F. above the average melting point temperature of the low melting point shortening. In still another aspect of this embodiment the average melting point temperature of the high melting point shortening is greater than about 100F. In one aspect of this embodiment the average melting point of both shortenings is greater than about 130° F. In yet another aspect of this embodiment, the high melting point shortening includes, but is not limited to, a soybean based edible oil or shortening sold under the trade name Dritex S Flakes or 102L by ACH. Use level of the high melting point oil ranges from 0.1-10% and more typically 1-6% of the final weight of the filling.

In accordance with the present invention there is provided a bake stable filling with a water activity of less than 0.60 and preferably less than 0.40, which filling comprises a matrix including a globulin protein, preferably whey protein, with a dispersion of oil. In one embodiment, the oil is liquid at room temperature and the filling has a pH less than 5.0. When the pH is greater than 5.0, a small amount of liquid oil is still used in combination of a larger percentage of shortening. This shortening is in the form of two shortenings with different melting points. The shortening melts to form liquid oil. In both instances, the whey protein is heat denaturated to form a gel that prevents oil from leaking from the filling during subsequent baking. When the pH is greater than 5.0, the low melting point shortening constitutes the majority of the shortening. A high melting point shortening is combined with the low melting shortening to control the consistency of the resulting filling. Shortening is herein referred to as solid oil. When the protein of the invention is whey protein concentrate, the protein is greater than 60% and preferably at least about 80%. Such concentrate is readily available and is somewhat inexpensive. To impart further bake stability to the filling, a colloidal suspension of microcrystalline cellulose is incorporated into the initial matrix before the whey protein is added. Whey protein gels when heated and has an affinity for the oil to essentially prevent liquid oil from leakage during subsequent baking of a dough type product containing the filling.

The present invention can be used with fruit in the acidic version and non-fruit, such as cheddar cheese, in the neutral version. Oil is substituted for water to reduce the water activity so the oil gives fluidity or pumpability to the filling, even though it has an extremely low percentage of free water. In the fruit version only liquid oil is employed, while in the neutral version solid shortening having relatively low melting points are used with a small amount of liquid oil. The solid oil or shortening is melted during processing because of the increased temperature. The oil combines with the liquid humectant to increase fluidity during processing of the filling. An important aspect of the invention is adding the oil and a melted emulsion to a humectant liquid prior to addition of the globulin protein. In this manner, the oil can be mechanically dispersed as small particles, such as droplets, and held in that humectant by an emulsion before being subjected to the whey protein. When the filling is heated, the whey protein forms a particle gel to prevent leaking of oil during the subsequent baking process. In this manner, the low water activity filling can be added to the dough product before it is baked. This is a substantial advantage since a low water activity provides compatibility and long term life of the filling in the baked dough product. The whey protein denatures to form a gel and has an affinity for oil to hold the oil within the gel. The whey protein is a concentrate in powder form with over 80% protein. Such concentrate has a minor amount of lactose, a small constituent of cholesterol and is a natural food.

In still another aspect of this invention, the filling is formed by a novel method resulting in both the low water activity and bake stability of the filling. In this method, a humectant, such as glycerin, is combined with the available formula water. Using a high shear mixing device capable of reaching a speed of 8000 rpm, microcrystalline cellulose is slowly added to the glycerin/water mixture. The total solids of the glycerin mixture is in excess of 70% and more typically in excess of 75% (as glycerin). This represents a unique method in which microcrystalline cellulose can be dispersed and incorporated into a moisture starved filling having a final total solids ranging from 85-95% and whose water activity is less than 0.60. It is commonly held wisdom throughout industry that microcrystalline cellulose can only be properly dispersed in an environment where the total solids are no greater than 65%. Therefore, the ability to gain full functionality from the microcrystalline cellulose by dispersing it into a high solids environment has proven to be an important aspect of this invention. An emulsifier is then melted into the available liquid oil and the mixture is then added slowly to the glycerin/water/microcrystalline cellulose mixture under conditions of high shear. This forms a stable emulsion where the glycerin is the primary continuous phase and the oil is the dispersed phase. Minimizing the size of the oil droplets at this stage is important in helping prevent or minimize coalescence of the oil droplets in the final filling leading to the leaching out of oil when the filling is exposed to high oven temperatures. Next, the mixture is transferred to equipment such as a Stephan Universal type machine. This machine contains blades that turn at high speed and is able to handle more viscous material. At this stage remaining ingredients such as sweeteners, fruit powders or flakes, flavors, colors, cheese powders, seasonings, cocoa powder, caramel powder, or salt are added. The following step involves the addition of whey protein. Finally, starches and/or acid are added.

The method of the present invention mixes a humectant with a small amount of water and adds a microcrystalline cellulose dispersion. This produces an initial matrix into which liquid oil and an emulsifier is added to produce a matrix composition that is the same for both low pH fillings and high pH fillings. In the low pH fillings, the sweetener and fruit powder is then added with the whey protein concentrate and a certain amount of starch or acid. In the high pH version, solid vegetable shortening is added together with flavoring, such as cheese, with the whey protein concentrate. Then, starch sweetener and acid is added to finalize the filling. These two fillings can then be injected or applied to a dough product preparatory to baking. During the baking process, the oil which added the fluidity for processing is not leaked from the filling because the heat gelled whey protein essentially inhibits flow of heat thinned constituents from the filling. Since the filling has a water activity of less than 0.40, there can be no migration of liquid from the filling to the baked dough thus allowing a long shelf-life and maintenance of long term crispness and freshness.

The invention employs globulin protein, such as whey protein, as the constituent to prevent leaking of oil during the baking process. As is well known in the protein technology, the functionality of the protein is affected by the acidity of the mixture. This known physical characteristic of protein explains the need for using solid oils when the high pH filling is being manufactured for essentially non-fruit products. The whey protein is a globulin protein soluble in water and is used in the invention as a concentrate with at least 80% whey protein. Generally, whey protein concentrate has less than 90% protein. Because of the large size of protein molecules, the solution of globular proteins in water and in the liquid matrix of the present invention is colloidal. Molecules of globular protein are folded into compact units that often approach spherical shapes. The folding takes place in such a way that the hydrophobic parts are turned inwardly toward each other and away from water. The hydrophilic charge groups of the protein tend to stud the surface where they are near water. Denaturation is the irreversible precipitation or gel of proteins which occurs because of heat, strong acids or bases or various other agents. These properties of globulin protein including gelling and affinity for oil or water is employed to create the bake stability of the filling made in accordance with the present invention.

The primary object of the present invention is the provision of a filling with a water activity less than 0.4 that is bake stable. This eliminates the need for post-bake injection of the filling while preventing moisture migration into the snack or bake item, thus maintaining the crispness and freshness of the baked item.

Yet another object of the present invention is the provision of filling, as defined above, that minimizes oil migration from the filling both during and after baking to maintain crispness of the baked item or snack while enhancing the visual appearance of the item.

Still a further object of the present invention is the provision of the filling, as defined above, which filling is pumpable even though it has a very low water activity.

Another object of the present invention is the provision of a low water activity bake stable filling, as defined above, which bake stable filling exhibits extremely good flavor release and organoleptic characteristics.

Yet another object of the present invention is the provision of a method of making a low water activity bake stable filling which method combines humectant and a small amount of water with a dispersion of colloidal microcrystalline cellulose to which is added an oil and a melted emulsifier. This method produces a mixture into which an appropriate flavoring agent, either acidic or neutral, and where the constituents are locked in place with a globulin protein, such as whey protein.

Another object of the present invention is the provision of a method, as defined above, which method adds whey protein to a low water liquid mixture and then allows heating of the protein for denaturation of the protein to create a structure that holds in the liquid constituents of the filling during subsequent baking operation.

These and other objects and advantages will become apparent from the following description taken together with the accompanying drawings.

PREFERRED EMBODIMENT

Figure 1:
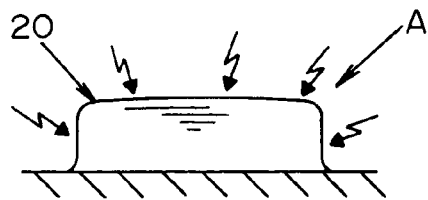
FIG. 1 is a side schematic view representing a test procedure for determining bake stability.
Figure 2:
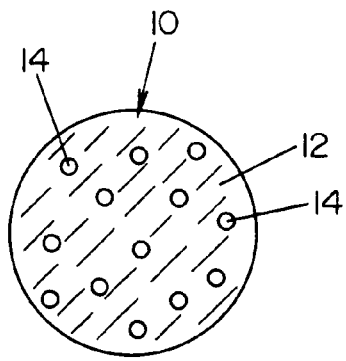
FIG. 2 is a schematic view in an enlarged circular view of the initial humectant mixture with oil droplets, which mixture constitutes the initial phase of forming a filling constructed in accordance with the present invention.
Figure 3:
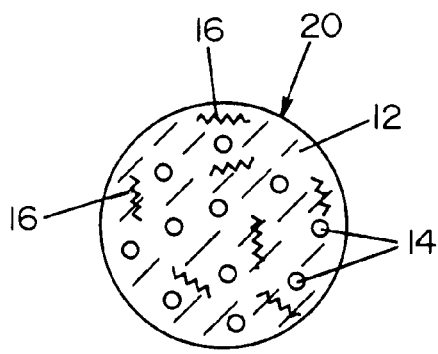
FIG. 3 is a schematic view, like FIG. 2, showing whey protein added to the mixture of FIG. 2 to hold the oil dispersion in the filling.
Figure 4A:
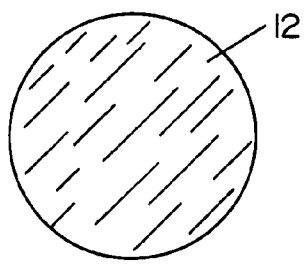
FIG. 4A is a schematic view, like FIG. 2, of an initial mixture used in the present invention, where a small amount of water is added to a liquid humectant to produce a liquid matrix preparatory to forming the matrix shown in FIG. 2.
Figure 4B:
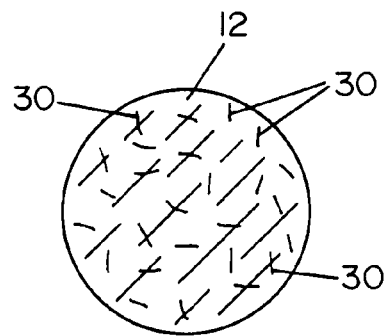
FIG. 4B is a schematic view similar to FIG. 4A with masticated microcrystalline cellulose added into the matrix preparatory to the acceptance of oil and an emulsifier, as shown in FIG. 2.
Figure 5:
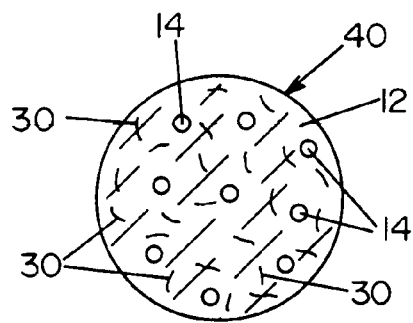
FIG. 5 is a schematic view similar to FIG. 4B showing the mixture as it is being processed after adding oil and melted emulsifier into the liquid matrix shown in FIG. 4B to produce the actual liquid initial mixture used in the present invention.
Figure 6:
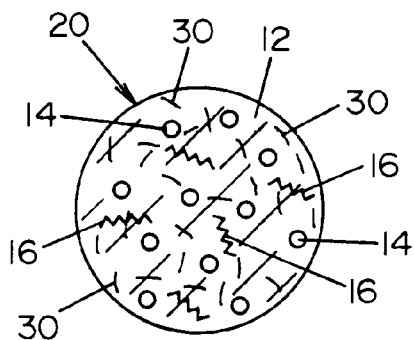
FIG. 6 is a schematic view, similar to FIG. 5, illustrating the oil containing mixture after it has been provided with a flavoring constituent and after being flow protected with whey protein.

Referring now to the drawings, wherein the showings are for the purpose of illustrating preferred embodiments of the invention only and not for the purpose of limiting same, FIG. 1 shows a disk, or sample A, of a filling constructed in accordance with the present invention as it is subjected to a temperature of 400° F. for five minutes. This test determines the heat stability of the novel filling 20 formed into test sample A. By using the present invention, which has a low water activity, filling 20 has substantially no spreading or leakage of oil or other constituents from the filling during a test performed as indicated in FIG. 1. Filling 20 of the present invention is prepared in successive process operations. The first operation produces a preparatory flowable mixture 10 shown in FIG. 2. This mixture 10 includes a humectant, such as glycerin, with a small amount of water illustrated as constituent 12 into which is dispersed a number of small oil droplets 14 together with a melted emulsifier not shown. Flowable mixture 10 of FIG. 2 has very little free water and a solids content of over 70%. It is ready to accept a flavoring agent and whey protein 16 to produce filling 20 as shown in FIG. 3. Filling 20 is a modification of mixture 10 by incorporating globulin protein 16, which is, in practice, whey protein concentrate having 80% whey protein. The whey protein acts in preparatory mixture 10 to prevent flow of oil droplets 14 during subsequent baking of filling 20. The low water activity of filling 20 maintains crispness of the resulting baked product. Preparatory mixture 10 is liquid at low temperature to impart a fluidity to the materials being processed in forming the filling. Consequently, a low water activity filling is provided with heat stability formulated by the gelling and affinity action of whey protein 16. FIG. 3 illustrates the constituents of the basic aspect of the present invention. Whey protein prevents oil from leaking from filling 20 during subsequent baking. In accordance with the invention, oil 14 is primarily liquid oil for a low pH filling, as created when using fruit flavoring. At high pH value, the oil droplets 14 are formed from both a small amount of liquid oil and a larger amount of solid oils which are combined low melting point and high melting point oils as disclosed in prior Jindra application Ser. No. 09/748,768, now U.S. Pat. No. 6,528,104. The shortenings in the form of solid oils are generally liquid at processing temperature. A basic aspect of the invention is illustrated in FIGS. 2 and 3. In practice mixture 10 is modified to include the addition of microcrystalline cellulose (MCC). This feature is illustrated in FIGS. 4-6 directed to more details of filling 20. In FIG. 4A, humectant, such as glycerin, is combined with a small amount of water to produce constituent 12 shown in FIG. 2. Thereafter, microcrystalline cellulose 30 (MCC) is added at high shear forming a colloidal dispersion (about 8000 rmp) to modify constituent 12, as shown in FIG. 4B. This new mixture has been subjected to high shear and has a solids content greater than 70%. This mixture constitutes a first aspect of the present invention. Low water activity constituent 12 is ready to be used as the primary receiving liquid for a low water activity filling. The process resulting in liquid constituent 12, as shown in FIG. 4B, is the same for both embodiments of the present invention. An emulsifier is mixed with oil to produce, ultimately, oil droplets 14. The oil/emulsifier is combined with liquid constituent 12 to produce an intermediate liquid emulsion mixture 40 illustrated in FIG. 5. Intermediate emulsion mixture 40 contains oil shown as oil droplets 14. The oil may be liquid oil or solid shortening particles liquified by the process temperature. The oil and a melted emulsifier prepares the mixture to accept the flavoring compound. After the flavoring compound is added to intermediate mixture 40, filling 20 is produced by adding whey protein, plus any starch or acid additive. This procedure results in a mixture as generally illustrated in FIG. 6. Filling 20, as discussed with respect to FIG. 3, has low water activity and is bake stable. The acidity of the flavoring determines the ability to use either all liquid oil droplets or liquid oil with solid low melting oils. As is known, the pH affects the operation of whey protein. FIG. 6 illustrates filling 20 constructed in accordance with the present invention. Whey protein 16 prevents oil droplets or particles 14 from leaking out during the heating process due to the gelling characteristics of the whey protein and the affinity of the whey protein to the oil and/or water.

EXAMPLE I

The preferred implementation of the present invention produces filling 20 illustrated schematically in FIGS. 1-6 with a fruit filling. This results in a pH less than 5.0 and preferably in the general range of 3.5-4.0. Example I is such a filling having a water activity of less than 0.40 and has the composition set forth below.

| INGREDIENT | % (W/W) |
|---|---|
| FRUCTOSE | 33.10 |
| GLYCERIN | 23.00 |
| VEGETABLE OIL | 17.00 |
| WHEY PROTEIN | 10.00 |
| WATER | 05.60 |
| FRUIT POWDERS/FLAKES | 05.50 |
| STARCH | 03.50 |
| EMULSIFIER | 01.00 |
| ACID | 00.60 |
| MICROCRYSTALLINE CELLULOSE | 00.50 |
| COLOR | 00.10 |
| FLAVOR | 00.10 |
| TOTAL | 100.00 |

In Example I, with the composition above, the primary constituents are humectant, preferably glycerin, fructose, whey protein, water, oil and an emulsifier. Of these primary constituents, the humectant has a general range of 10-30% by weight of the filling. The water has a level of less than 10%. The oil is less than 20% by weight of the filling. The other constituents of Example I can be varied according to the desired characteristics of final filling 20 so long as the filling has a water activity of less than 0.60, and preferably less than 0.40.

Figure 7:
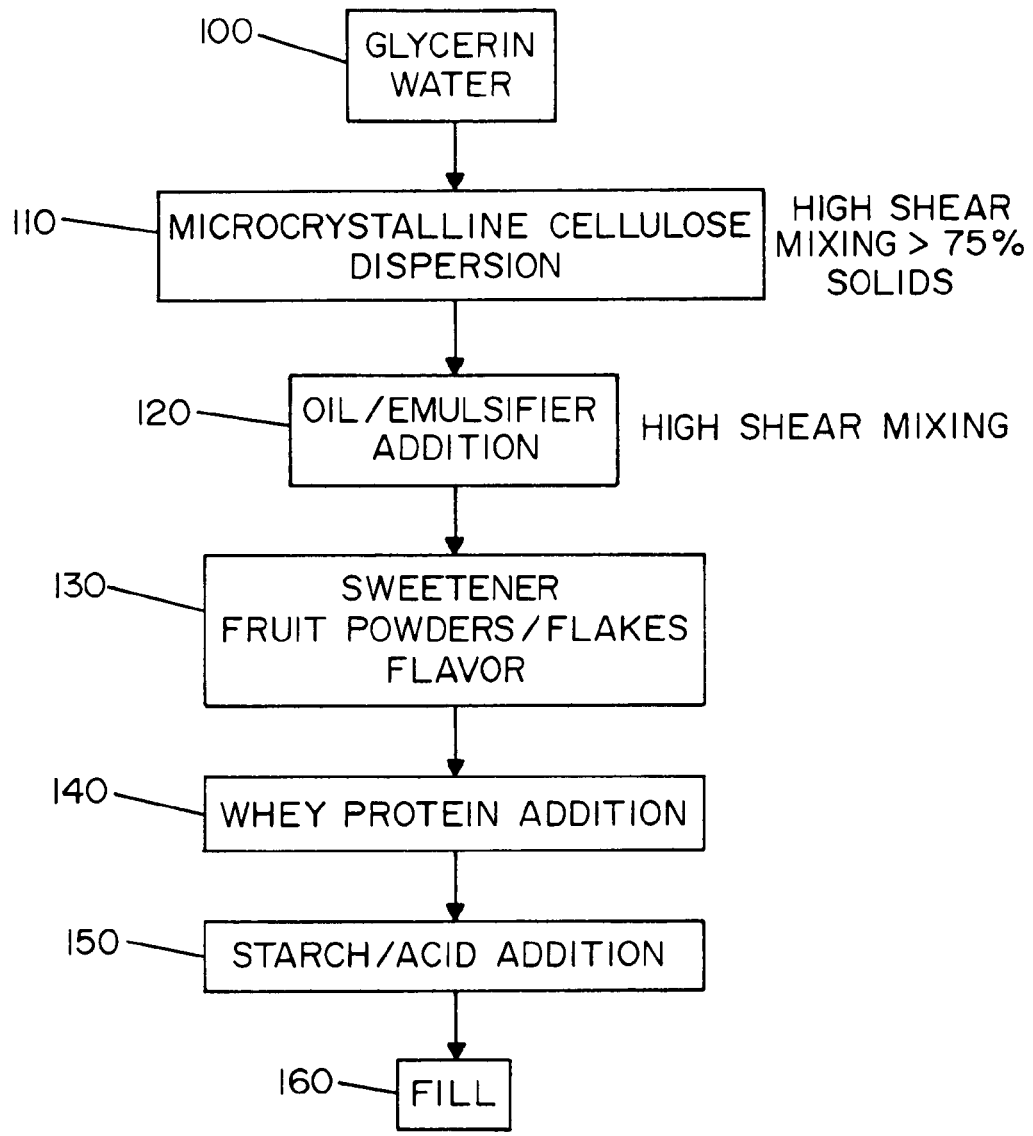
FIG. 7 is a flow chart illustrating the preferred embodiment of the present invention for making a low pH version of the low water activity bake stable filling; and, FIG. 8 is a flow chart illustrating the preferred embodiment of the present invention for producing a high pH version of the low water activity bake stable filling.

Referring now to FIG. 7, a method for producing Example I is disclosed. In step 100, glycerin is combined with the water using a Silverson mixer operated at 8,000 rpm for ten minutes. During this procedure, microcrystalline cellulose (MCC) is dispersed into the glycerin and water mixture. This mixture or dispersion is indicated as step 110. Thereafter, the vegetable oil and emulsifier, such as Panodan, is heated together and mixed with the glycerin and water mixture while a good vortex is maintained as illustrated as procedure 120. The resulting mixture occurs for one minute after completing addition of all of the emulsifier and oil. The mixture as schematically illustrated in FIGS. 2 and 4B is transferred to a Cuissinart for the addition of the fructose or other sweetener. This is step 130. During step 130 powdered fructose, fruit powder and flakes flavor are mixed for about 30 seconds. Then whey protein concentrate is added as indicated in step 140. The whey protein is mixed for approximately 30 seconds. This process is followed by adding a small amount of a cold water swelling starch which is a combination of both a thickening starch and a gelling starch. Then filling 20 is deposited onto or into a dough carrier for subsequent baking. In practice, there is an intermediate storage followed by a transportation operation illustrated collectively as "fill" step 160. In practice this step is filling a container for transport of filling 20 to a bakery. Filling 20 has whey protein which is denatured by a combination of heat and pH during the baking process, if not by the processing heat during steps 140, 150. The resulting low pH filling has a water activity of less than 0.40.

EXAMPLE II

When using the present invention for a more neutral filling, such as cheese or other savory flavoring, the invention has the composition set forth in the following table.

| INGREDIENT | % (W/W) |
|---|---|
| GLYCERIN | 27.00 |
| CHEESE POWDER | 20.76 |
| VEGETABLE SHORTENING | 16.00 |
| MALTODEXTRIN | 11.70 |
| WHEY PROTEIN | 08.00 |
| WATER | 06.99 |
| VEGETABLE OIL | 04.00 |
| STARCH | 02.50 |
| SALT | 01.08 |
| MICROCRYSTALLINE CELLULOSE | 00.60 |
| FLAVOR | 00.50 |
| ACID | 00.50 |
| COLOR | 00.20 |
| EMULSIFIER | 00.10 |
| TOTAL | 100.00 |

As discussed with respect to Example I, the preliminary mixture of Example II contains a humectant with water, oil and an emulsifier. To this preliminary mixture is added the flavoring constituent and whey protein for the purpose of locking the oil into the filling to obtain bake stability. The same general range of the preliminary mixture are applicable for all examples.

Figure 8:
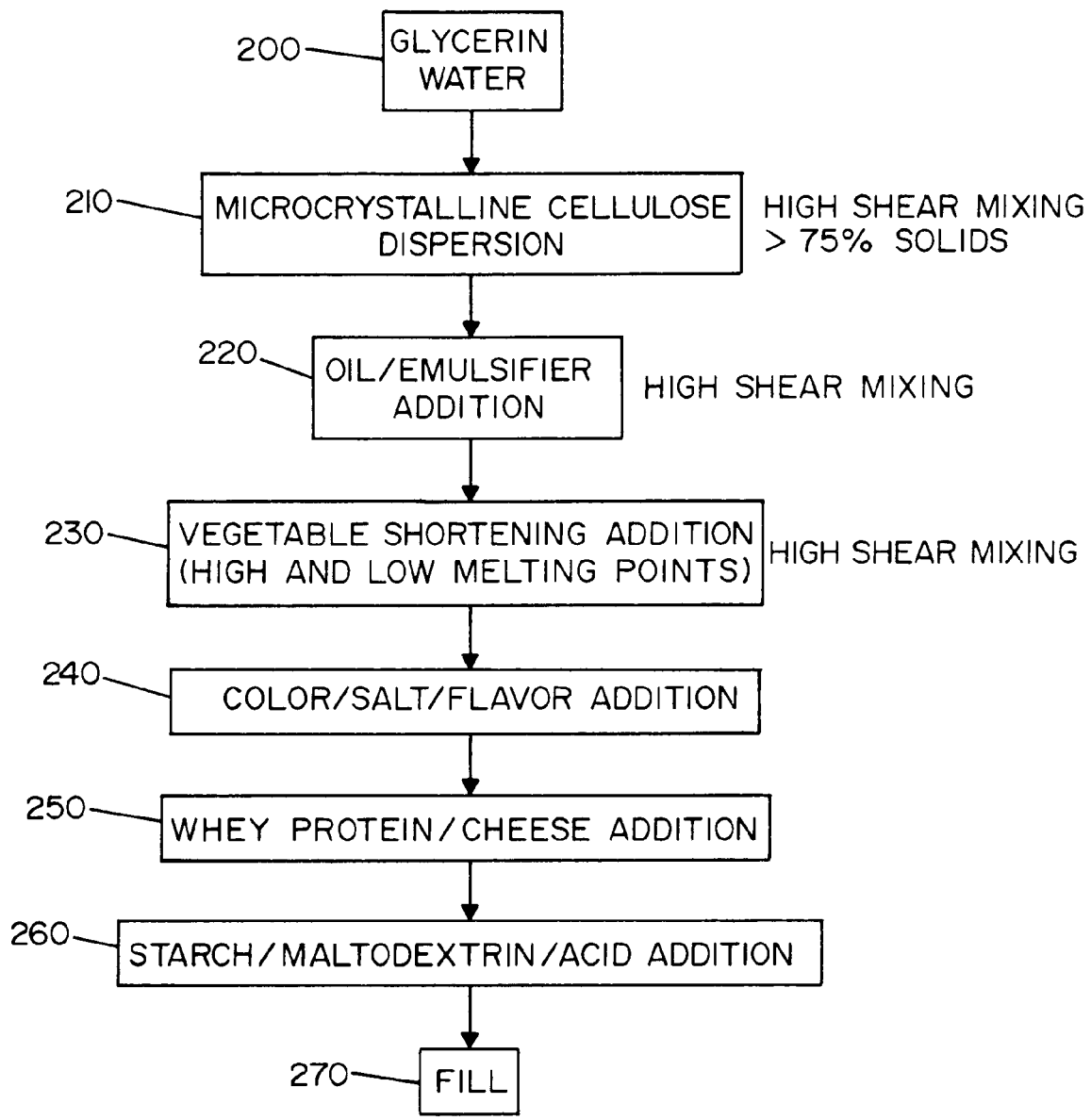

Referring now to FIG. 8, illustrating the method of making Example II, the glycerin and water is mixed in a Silverson mixer for ten minutes at 8,000 rpm as illustrated by step 200. During this ten minutes, the microcrystalline cellulose is dispersed in the glycerin and water. The step 210 is performed during the first ten minute mixing procedure. Thereafter, heated emulsifier and liquid oil is added to the glycerin mixture in the Silverson while maintaining a good vortex. The material in the Silverson is mixed for one minute after all the oil has been added at a speed about 10,000 rpm. In this method, vegetable oil is mixed at 10,000 rpm. This represents merely a small amount of liquid oil. So far, the method of FIG. 8 is the same process as used for Example I. An intermediate mixture schematically illustrated in FIGS. 2 and 5 is obtained. This is step 220. Thereafter, the mixture illustrated in FIGS. 2 and 5 is transferred to a Stephan mixer. The solid oil or vegetable shortening is then added and mixed for one minute. This is illustrated as step 230. This step is followed by step 240 where the color salts and flavoring is added. The Stephan machine is operated for ten seconds followed by the addition of the whey protein concentrate and cheddar cheese additive, shown at step 250. Following thirty seconds of mixing, maltodextrin, starch and acid are added and mixed for fifteen seconds. This is indicated as step 260. Mixing times in steps 210 through 260 may vary based on the total amount of shear achieved from the equipment. Filling 20 is now deposited or filled and stored for use in a baking procedure. The fill operation is step 270.

Having thus defined the invention, the following is claimed:

1. A bake stable filling with a water activity of less than 0.60 comprising a matrix including a globulin protein with a dispersion of oil in humectant, and having substantially no spreading or leakage of oil when a disk of said filling is heated to 400° F. for 5 minutes.

2. A filling as defined in claim 1 wherein said oil is liquid at room temperature.

3. A filling as defined in claim 2 wherein said globulin protein is whey protein.

4. A filling as defined in claim 3 wherein said water activity is less than 0.40.

5. A filling as defined in claim 4 wherein said whey protein is a concentrate with greater than 60% protein.

6. A filling as defined in claim 3 wherein said whey protein is a concentrate with greater than 60% protein.

7. A filling as defined in claim 3 including a colloidal dispersion of microcrystalline cellulose.

8. A filling as defined in claim 2 wherein said water activity is less than 0.40.

9. A filling as defined in claim 2 including a colloidal dispersion of microcrystalline cellulose.

10. A filling as defined in claim 1 wherein said oil is solid at room temperature.

11. A filling as defined in claim 10 wherein said oil comprises a high melting point oil and a low melting point oil.

12. A filling as defined in claim 11 wherein the low melting point oil is up to 50% by weight of the filling.

13. A filling as defined in claim 12 wherein the melting point of the high melting point oil is at least about 100° F.

14. A filling as defined in claim 12 wherein the high melting point oil is less than 10% by weight of the filling.

15. A filling as defined in claim 14 wherein the pH of said filling is greater than about 5.0.

16. A filling as defined in claim 12 wherein the pH of said filling is greater than about 5.0.

17. A filling as defined in claim 11 wherein the low melting point oil is in the general range of 10-30% by weight of the filling.

18. A filling as defined in claim 11 wherein the melting point of the high melting point oil is at least 5° F. above the average melting point of the low melting point oil.

19. A filling as defined in claim 18 wherein the melting point of the high melting point oil is at least about 100° F.

20. A filling as defined in claim 11 wherein the melting point of the high melting point oil is at least 10° F. above the average melting point of the low melting point oil.

21. A filling as defined in claim 11 wherein the melting point of the high melting point oil is at least 20° F. above the average melting point of the low melting point oil.

22. A filling as defined in claim 11 wherein the melting point of the high melting point oil is at least 40° F. above the average melting point of the low melting point oil.

23. A filling as defined in claim 11 wherein the melting point of the high melting point oil is at least about 100° F.

24. A filling as defined in claim 11 wherein the high melting point oil is less than 10% by weight of the filling.

25. A filling as defined in claim 24 wherein the pH of said filling is greater than about 5.0.

26. A filling as defined in claim 11 wherein the pH of said filling is greater than about 5.0.

27. A filling as defined in claim 11 wherein said globulin protein is whey protein.

28. A filling as defined in claim 27 wherein said water activity is less than 0.40.

29. A filling as defined in claim 28 wherein said whey protein is a concentrate with greater than 60% protein.

30. A filling as defined in claim 27 wherein said whey protein is a concentrate with greater than 60% protein.

31. A filling as defined in claim 27 including a colloidal dispersion of microcrystalline cellulose.

32. A filling as defined in claim 11 wherein said water activity is less than 0.40.

33. A filling as defined in claim 10 wherein the pH of said filling is greater than about 5.0.

34. A filling as defined in claim 33 wherein said globulin protein is whey protein.

35. A filling as defined in 34 wherein said water activity is less than 0.40.

36. A filling as defined in claim 35 wherein said whey protein is a concentrate with greater than 60% protein.

37. A filling as defined in claim 34 wherein said whey protein is a concentrate with greater than 60% protein.

38. A filling as defined in claim 37 including a colloidal dispersion of microcrystalline cellulose.

39. A filling as defined in claim 34 including a colloidal dispersion of microcrystalline cellulose.

40. A filling as defined in claim 10 wherein said globulin protein is whey protein.

41. A filling as defined in claim 40 wherein said water activity is less than 0.40.

42. A filling as defined in claim 41 wherein said whey protein is a concentrate with greater than 60% protein.

43. A filling as defined in claim 40 wherein said whey protein is a concentrate with greater than 60% protein.

44. A filling as defined in claim 40 including a colloidal dispersion of microcrystalline cellulose.

45. A filling as defined in claim 10 wherein said water activity is less than 0.40.

46. A filling as defined in claim 10 including a colloidal dispersion of microcrystalline cellulose.

47. A filling as defined in claim 1 wherein said globulin protein is whey protein.

48. A filling as defined in claim 47 wherein said water activity is less than 0.40.

49. A filling as defined in claim 48 wherein said whey protein is a concentrate with greater than 60% protein.

50. A filling as defined in 47 wherein said whey protein is a concentrate with greater than 60% protein.

51. A filling as defined in claim 47 including a colloidal dispersion of microcrystalline cellulose.

52. A filling as defined in claim 1 wherein said water activity is less than 0.40.

53. A filling as defined in claim 52 including a colloidal dispersion of mtcrocrystalline cellulose.

54. A filling as defined in claim 1 including a colloidal dispersion of microcrystalline cellulose.

55. A filling as defined in claim 1 wherein said filling is formed by adding said oil and a melted emulsion to a liquid humectant prior to addition of said globulin protein.

56. A filling as defined in claim 55 wherein said oil is mechanically dispersed as small particles in said liquid humectant.

57. The filling of claim 1, wherein the filling contains enough water so that the globulin protein forms a gel when heated but not so much water that the water activity of the filling is 0.6 or more.

58. The filling of claim 1 wherein the filling contains at least about 5.6% but less than about 10% water.

59. A bake stable filling with a water activity less than 0.60 and a pH less than about 5.0, said filling comprising:
   humectant 10-30% by weight;
   whey protein;
   water less than 10%;
   emulsifier; and liquid oil less than 20% by weight, the filling exhibiting substantially no spreading or leakage of oil when a disk of said filling is heated to 400° F. for 5 minutes.

60. The filling of claim 59, wherein the water comprises at least about 5.6% but less than about 10%.

61. A bake stable filling with a water activity less than 0.60 and a pH greater than about 5.0, said filling comprising:
   humectant 10-30% by weight;
   whey protein;
   water less than 10% by weight;
   solid oil less than 20% by weight; and
   emulsifier, the filling exhibiting substantially no spreading or leakage of oil when a disk of said filling is heated to 400° F. for 5 minutes.

62. The filling of claim 61 wherein the water comprises at least about 5.6% but less than about 10%.

63. A method of making a bake stable filling having a water activity of less than 0.60 and exhibiting substantially no spreading or leakage of oil when a disk of said filling is heated to 400° F. for 5 minutes, said method comprising:
   (a) adding oil and an emulsifier under high shear to a mixture of water, liquid humectant, and microcrystalline cellulose, the mixture containing at least 60% humectant and further having a solids content of at least 70%; and
   (b) adding a whey protein concentrate to the mixture formed in (a) to form the filling.

64. A method of making a bake stable filling having a water activity of less than 0.60 and exhibiting substantially no spreading or leakage of oil when a disk of said filling is heated to 400° F. for 5 minutes, said method comprising:
   (a) mixing glycerin and water with a resulting solids content of over 0.60% at high shear;
   (b) dispersing microcrystalline cellulose as a colloidal dispersion to the mixture formed in (a) to provide a matrix mixture with a solids content of over 70%;
   (c) adding a mixture of liquid oil and a melted emulsifier to said matrix mixture;
   (d) adding sweetener and flavoring to the mixture formed in (c);
   (e) adding a whey protein concentrate to the mixture formed in and (d);
   (f) adding starch to the mixture formed in (e), to form the filling.

65. A method as defined in claim 64 including adding two oils solid at room temperature and having different melting temperature.

66. A method as defined in claim 65 wherein said flavoring causes a pH of over 5.0.

67. A method as defined in claim 64 wherein said flavoring causes a pH of over 5.0.

68. A method as defined in claim 64 wherein said flavoring causes a pH of less than 5.0.

69. A bake stable filling comprising a dispersion of oil in a matrix including a humectant and formed from a thermally induced gel of a globulin protein in water, the filling having a water activity of less than 0.60 and exhibiting substantially no spreading or leakage of oil when baked at 400° F. for 5 minutes.

70. The filling of claim 69 wherein the filling contains enough water so that the globulin protein forms a gel when heated but not so much water that the water activity of the filling is 0.6 or more.

71. The filling of claim 69 wherein the filling contains about 5.6 to less than 10% water.

72. The filling of claim 69 wherein the filling is made by combining oil and an emulsifier under high shear mixing with a mixture of water, a humectant and microcrystalline cellulose, the mixture having a solids content of at least about 70%.

73. The filling of claim 69 wherein the filling further contains a low melting shortening as well as a high melting shortening having a melting point at least 5° F. greater than the melting point of the low melting shortening.

74. The filing of claim 70 wherein the filling has a pH of above 5.0.

75. The filing of claim 69 wherein the filling has a pH of 3.0 to 5.0.

* * * * *

UNITED STATES PATENT AND TRADEMARK OFFICE
CERTIFICATE OF CORRECTION

| | | |
|---|---|---|
| PATENT NO. | : 7,452,564 B2 | Page 1 of 1 |
| APPLICATION NO. | : 10/408162 | |
| DATED | : November 18, 2008 | |
| INVENTOR(S) | : James A. Jindra, John P. Hansen and Mark S. Grucza | |

It is certified that error appears in the above-identified patent and that said Letters Patent is hereby corrected as shown below:

Title page, item (54) after "FILLING" please add -- AND METHOD OF MAKING --.

Claim 64, Column 14, line 2, after "(d);" please insert -- and --.

Signed and Sealed this

Thirteenth Day of January, 2009

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,452,564 B2 | Page 1 of 1 |
| APPLICATION NO. | : 10/408162 | |
| DATED | : November 18, 2008 | |
| INVENTOR(S) | : James A. Jindra, John P. Hansen and Mark S. Grucza | |

It is certified that error appears in the above-identified patent and that said Letters Patent is hereby corrected as shown below:

Title page, item (54) and Column 1, line 2, after "FILLING" please add -- AND METHOD OF MAKING --.

Claim 64, Column 14, line 2, after "(d);" please insert -- and --.

This certificate supersedes the Certificate of Correction issued January 13, 2009.

Signed and Sealed this

Third Day of February, 2009

JOHN DOLL
*Acting Director of the United States Patent and Trademark Office*